(12) United States Patent
Summers et al.

(10) Patent No.: US 9,707,807 B2
(45) Date of Patent: Jul. 18, 2017

(54) PINLESS INDUCTIVE CONNECTOR ASSEMBLY

(71) Applicant: Goodrich Corporation, Charlotte, NC (US)

(72) Inventors: Paul L. Summers, Troy, OH (US); Steven Keller, Union, OH (US); Perry Leaves, Piqua, OH (US)

(73) Assignee: Goodrich Corporation, Charlotte, NC (US)

( * ) Notice: Subject to any disclaimer, the term of this patent is extended or adjusted under 35 U.S.C. 154(b) by 356 days.

(21) Appl. No.: 14/318,016

(22) Filed: Jun. 27, 2014

(65) Prior Publication Data
US 2015/0375579 A1    Dec. 31, 2015

(51) Int. Cl.
| | |
|---|---|
| B60C 23/04 | (2006.01) |
| H01F 38/14 | (2006.01) |
| B64C 25/36 | (2006.01) |
| H01F 27/02 | (2006.01) |
| H01F 27/24 | (2006.01) |
| H01F 27/28 | (2006.01) |
| H01R 13/66 | (2006.01) |

(52) U.S. Cl.
CPC .......... *B60C 23/0427* (2013.01); *B64C 25/36* (2013.01); *H01F 27/02* (2013.01); *H01F 27/24* (2013.01); *H01F 27/2823* (2013.01); *H01F 38/14* (2013.01); *H01R 13/6633* (2013.01)

(58) Field of Classification Search
CPC ..... H01R 13/6633; H01F 38/14; H01F 27/24; H01F 27/02; H01F 27/2823; B60C 23/0427; B64C 25/36
See application file for complete search history.

(56) References Cited

U.S. PATENT DOCUMENTS

| | | | | |
|---|---|---|---|---|
| 4,334,428 A | * | 6/1982 | Fima | .................... B60C 23/042 |
| | | | | 340/448 |
| 4,838,797 A | | 6/1989 | Dodier | |

(Continued)

FOREIGN PATENT DOCUMENTS

| | | |
|---|---|---|
| DE | 19621003 A1 | 11/1997 |
| DE | 102006019555 B3 | 11/2007 |

(Continued)

OTHER PUBLICATIONS

Extended European Search Report, EP Application No. 15173442.3-1556, dated Nov. 30, 2015, 14 pages.

*Primary Examiner* — An T Nguyen
(74) *Attorney, Agent, or Firm* — Kinney & Lange, P.A.

(57) ABSTRACT

A connector assembly includes a first side connector and a second side connector. The first side connector includes a first protective housing, a first inductor including a first end face, and a first physical connector element. The second side connector includes a second protective housing, a second inductor including a second face, and a second physical connector element. The second physical connector element is engaged with the first physical connector element and physically connects the first side connector to the second side connector such that the first end face and the second end face are adjacent. The first inductor and the second inductor are axially spaced apart. The first inductor and the second inductor form an inductive telemetry connection between the first side connector and the second side connector.

13 Claims, 5 Drawing Sheets

(56) References Cited

U.S. PATENT DOCUMENTS

| | | | |
|---|---|---|---|
| 5,122,729 A | 6/1992 | Itoga et al. | |
| 5,488,352 A | 1/1996 | Jasper | |
| 6,470,933 B1 * | 10/2002 | Volpi | B29D 30/48 |
| | | | 152/152.1 |
| 6,476,520 B1 | 11/2002 | Bohm et al. | |
| 6,486,771 B1 * | 11/2002 | Fuller | B60C 23/0408 |
| | | | 200/61.22 |
| 6,590,395 B2 | 7/2003 | Reykowski et al. | |
| 6,921,283 B2 | 7/2005 | Zahlit et al. | |
| 7,210,940 B2 | 5/2007 | Baily et al. | |
| 8,102,230 B2 | 1/2012 | Eriksen | |
| 9,443,358 B2 * | 9/2016 | Breed | G06F 8/65 |
| 2005/0046558 A1 * | 3/2005 | Buenz | B60C 23/0428 |
| | | | 340/445 |
| 2006/0025897 A1 * | 2/2006 | Shostak | B60C 23/005 |
| | | | 701/1 |
| 2006/0148278 A1 * | 7/2006 | Baily | G01D 11/245 |
| | | | 439/38 |
| 2006/0212193 A1 * | 9/2006 | Breed | B60C 23/0425 |
| | | | 701/33.7 |
| 2014/0102807 A1 | 4/2014 | Zhao et al. | |
| 2014/0252876 A1 * | 9/2014 | Riezebos | H01F 38/14 |
| | | | 307/104 |
| 2015/0138031 A1 * | 5/2015 | Van Gils | H01F 38/14 |
| | | | 343/788 |
| 2015/0375579 A1 * | 12/2015 | Summers | B60C 23/0427 |
| | | | 301/5.1 |

FOREIGN PATENT DOCUMENTS

| | | |
|---|---|---|
| DE | 102012212254 B3 | 1/2014 |
| EP | 2674950 A1 | 12/2013 |
| GB | 2395566 A | 5/2004 |
| WO | 2011057343 A1 | 5/2011 |

* cited by examiner

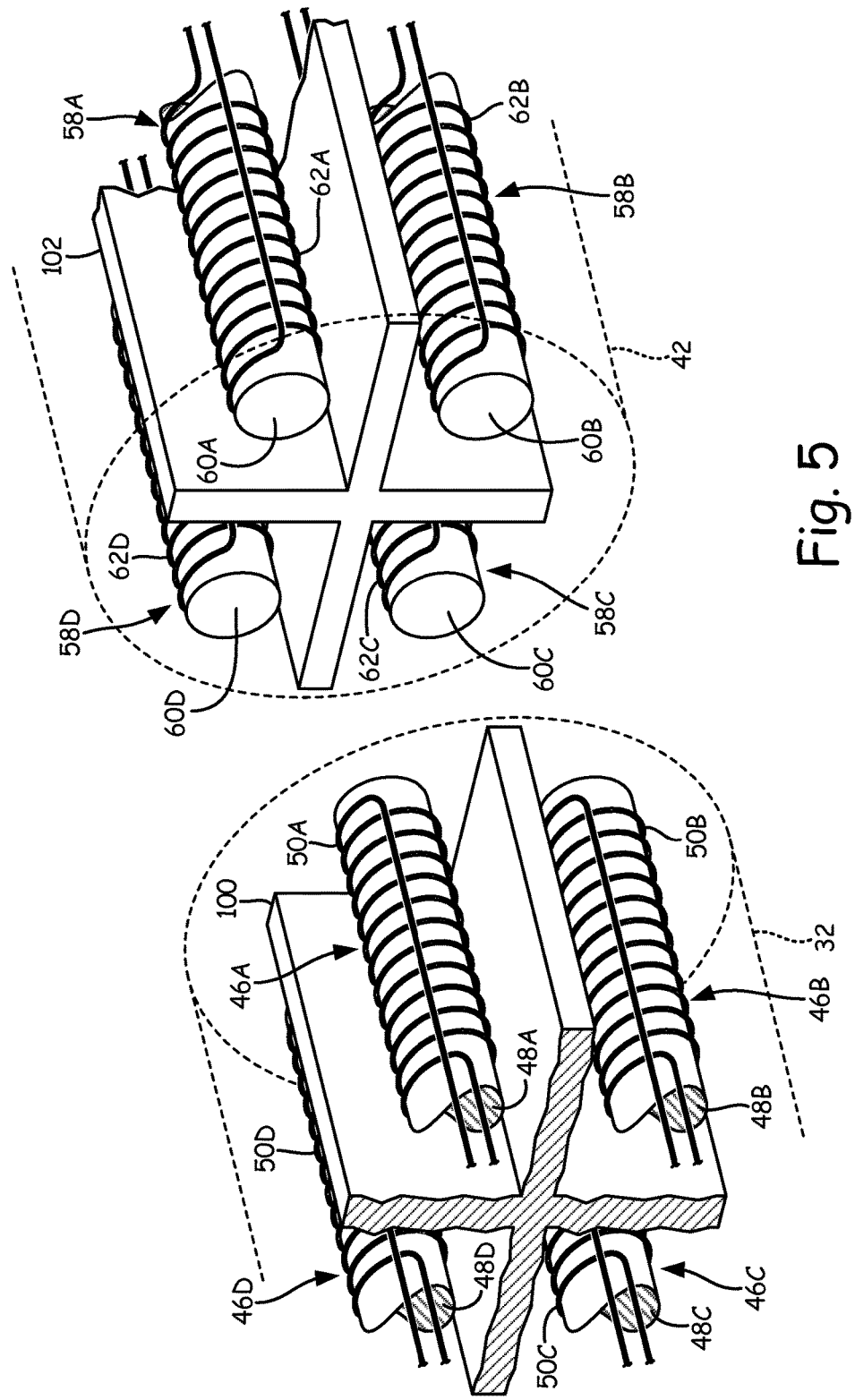

PINLESS INDUCTIVE CONNECTOR ASSEMBLY

BACKGROUND

The present invention relates to electrical connector assemblies. In particular, the invention relates to inductive connector assemblies.

Electronics systems typically employ connector assemblies to connect elements of an electrical system. Typically, a connector assembly employs pins on one side of the connector assembly which engage corresponding sockets on another side of the connector assembly to make an electrical connection. While the two sides are mated to form the connection, the connector pins are protected and shielded from environmental conditions which may be aggressive enough to damage the pins. Such aggressive environmental conditions may include for example, salts, sea water, and corrosive chemicals. In some applications, connector assemblies must be unmated frequently in such aggressive environmental conditions, which can expose the pins and sockets to damage due to corrosion. In addition, the mere action of mating and unmating pinned connector assemblies causes wear to the pins or physical damage, such as bending of the pins. Physical damage is particularly likely in connector assemblies with many pins.

A pinned connector assembly may also suffer damage even while the two sides are mated as a result of vibration causing fretting wear. The connector assembly may experience vibrations over a period time during which the pin and socket surfaces rub against each other. This fretting action abrades the surfaces and damages protective platings on the pin and socket surfaces. Fretting wear makes the connector assembly even more susceptible to environmental damage.

In many applications, but especially in aerospace applications, it is critical to have reliable and durable electrical connections that are not as susceptible to the above problems.

SUMMARY

An embodiment of the present invention includes an assembly for forming an inductive telemetry connection. The assembly includes a first side connector and a second side connector. The first side connector includes a first protective housing, a first inductor, and a first physical connector element. The first protective housing includes a first end face. The first inductor is contained within the first protective housing and is adjacent to the first end face. The first inductor has a first axis. The second side connector includes a second protective housing, a second inductor, and a second physical connector element. The second protective housing includes a second face. The second inductor is contained within the second protective housing and is adjacent to the second end face. The second inductor has a second axis. The second physical connector element is configured to engage with the first physical connector element such that the first end face and the second end face are adjacent, and physically connect the first side connector to the second side connector such that the first axis and the second axis are aligned with each other. The first inductor and the second inductor are axially spaced apart. A portion of the first protective housing is directly between the first inductor and the second inductor. The first inductor and the second inductor form an inductive telemetry connection between the first side connector and the second side connector.

Another embodiment of the present invention is a connector assembly including a first side connector and a second side connector. The first side connector includes a first protective housing, a first inductor, and a first physical connector element. The first protective housing includes a first end face. The first inductor is contained within the first protective housing and is adjacent to the first end face. The first inductor has a first axis. The second side connector includes a second protective housing, a second inductor, and a second physical connector element. The second protective housing includes a second face. The second inductor is contained within the second protective housing and is adjacent to the second end face. The second inductor has a second axis. The second physical connector element is engaged with the first physical connector element and physically connects the first side connector to the second side connector such that the first end face and the second end face are adjacent, and the first axis and the second axis are aligned with each other. The first inductor and the second inductor are axially spaced apart. A portion of the first protective housing is directly between the first inductor and the second inductor. The first inductor and the second inductor form an inductive telemetry connection between the first side connector and the second side connector.

BRIEF DESCRIPTION OF THE DRAWINGS

FIG. 5 shows an embodiment using arrays of inductors to establish multiple channel communication.

DETAILED DESCRIPTION

Figure 1:
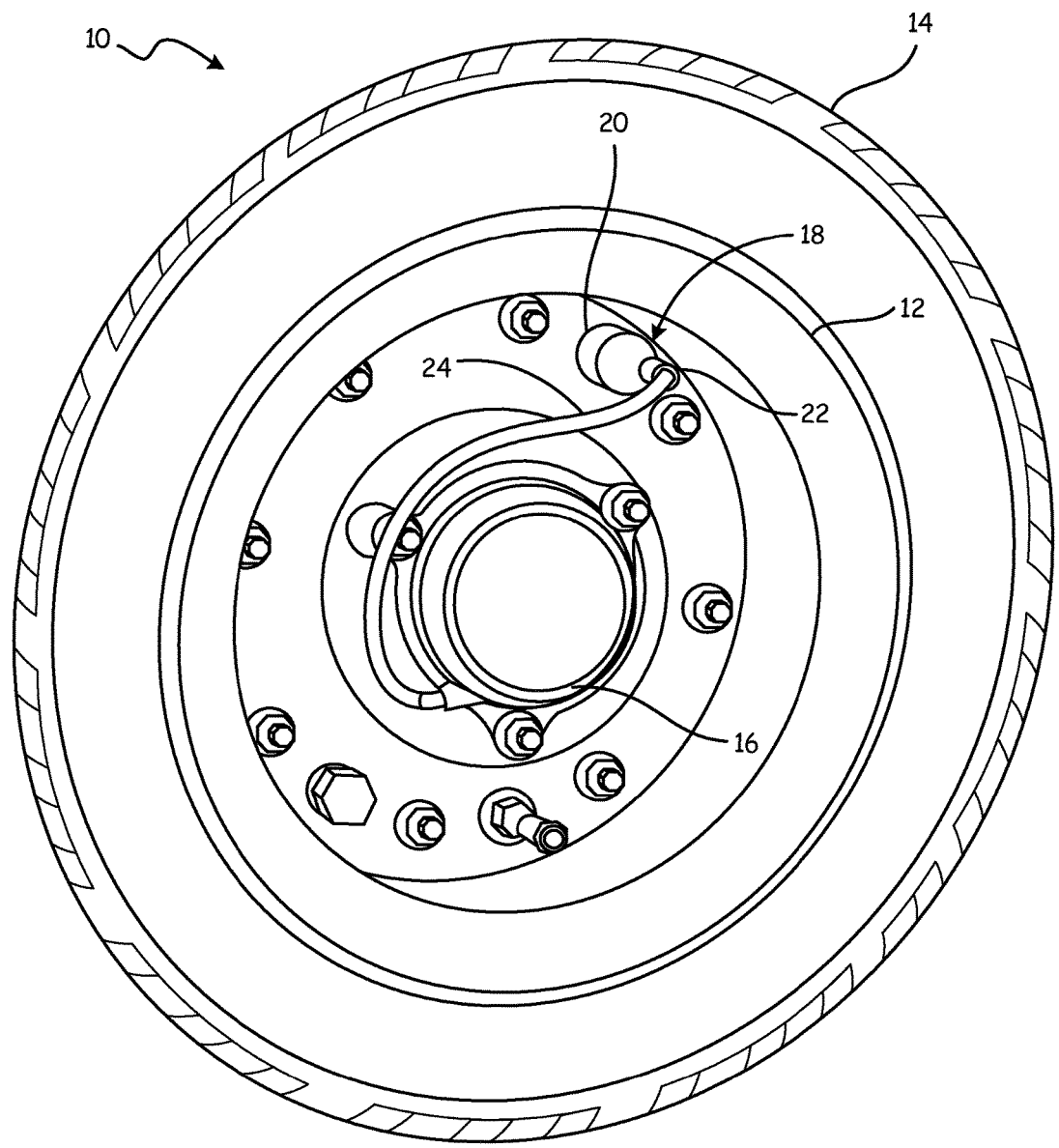
FIG. 1 is perspective view of a wheel assembly.

FIG. 1 is a perspective view of a wheel assembly that may usefully employ an embodiment of the present invention. Wheel assembly 10 may be part of an aircraft landing gear. FIG. 1 shows wheel assembly 10 including wheel 12, tire 14, hub assembly 16, and transducer assembly 18. Transducer assembly 18 includes sensor 20, connector assembly 22, and electrical cable 24. Tire 14 is fitted around wheel 12. Hub assembly 16 provides an electrical connection to a measurement or control system (not shown). Transducer assembly 18 is fitted to wheel 12 such that sensor 20 may sense a physical characteristic of tire 14, such as pressure within tire 14. Connector assembly 22 is positioned external to wheel 12 to connect electrical cable 24 to sensor 20.

In operation, sensor 20 senses pressure within tire 14 and transmits pressure data across connector assembly 22 and to electrical cable 24. Hub assembly 16 receives the pressure data by way of electrical cable 24 and sends it to the measurement or control system. Power for the operation of sensor 20 may be provided from the measurement or control system by way of the reverse path from hub assembly 16 to sensor 20.

Figure 2A:
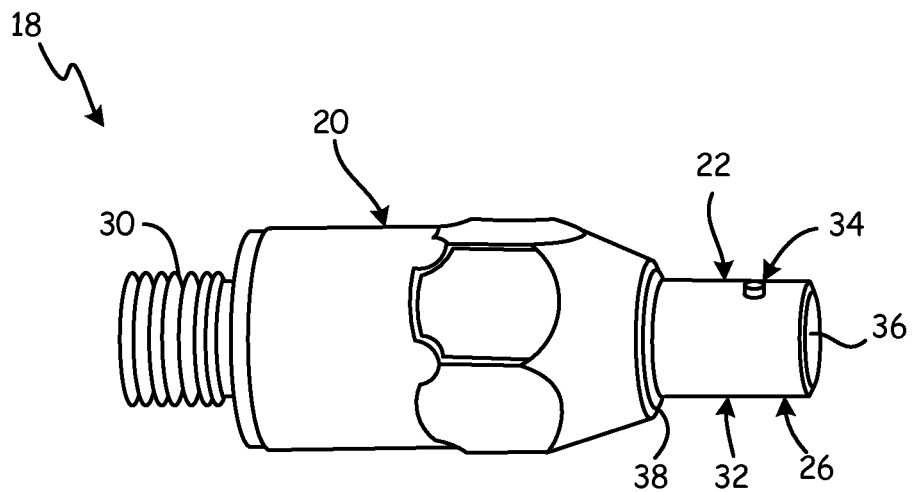
FIGS. 2A and 2B are perspective views of a disengaged connector assembly illustrating a sensor assembly and a first side connector of a connector assembly; and an electrical cable with a second side connector of the connector assembly, respectively.
Figure 2B:
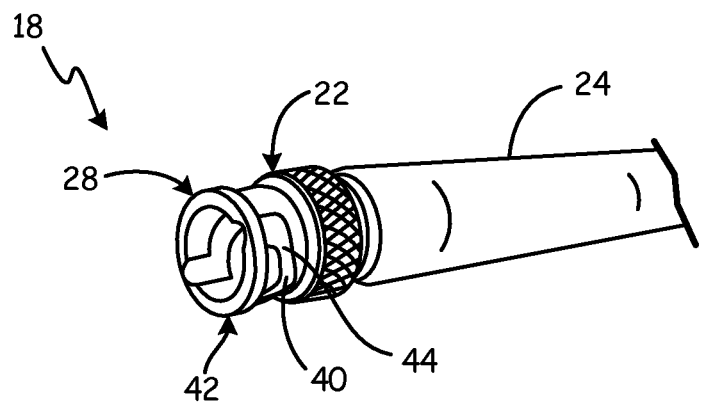

FIGS. 2A and 2B are perspective views illustrating connector assembly 22 in a disconnected state. As shown in FIGS. 2A and 2B, connector assembly 22 includes first side connector 26 and second side connector 28. FIG. 2A shows sensor 20 including sensing end 30. In this embodiment, sensing end 30 is a threaded connection for attaching to wheel 12 (FIG. 1). First side connector 26 includes first protective housing 32 and first physical connector element 34. First protective housing 32 includes first end face 36. As also shown in FIG. 2A, first side connector 26 projects from sensor 20. Sensor 20 and first side connector 26 are connected, as described below in reference to FIG. 3 at joint 38 and may together form a hermetic enclosure. First protective housing 32 may be made of metal, for example, stainless steel, or other material such as molded plastic.

FIG. 2B shows that second side connector 28 projects from an end of electrical cable 24. Second side connector 28 includes second protective housing 40 and second physical connector element 42. Second protective housing 40 includes second end face 44 (more clearly seen in FIGS. 3 and 4). Second protective housing 40 may be made of a polymer material having a thermal expansion coefficient comparable to that of electrical cable 24 to reduce thermal stresses between electrical cable 24 and second protective housing 40. Second physical connector element 42 is configured to engage with first physical connector element 34 such that, once fully engaged, first end face 36 and second end face 44 are adjacent. In the illustrated embodiment, first physical connector element 34 and second physical connector element 42 are mating portions of a bayonet-style or BNC connector. In other embodiments, first physical connector element 34 and second physical connector element 42 may be, for example, mating portions of a threaded connector. Other connector styles, such as 38999 style or Mighty Mouse or 2M style can be used in other embodiments.

Figure 3:
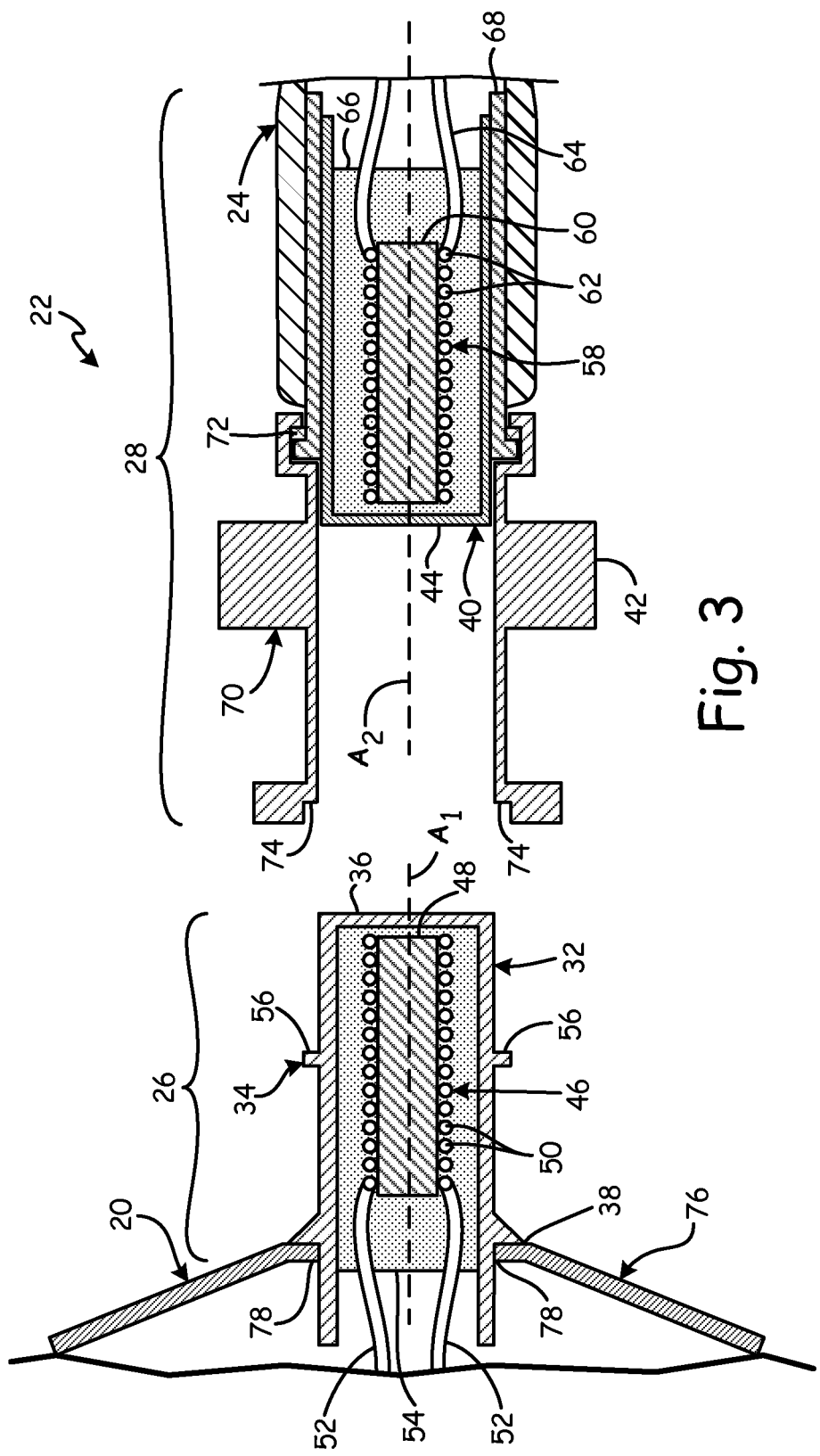
FIG. 3 is a schematic cross-sectional view of the disengaged connector assembly shown in FIGS. 2A and 2B.

FIG. 3 is a schematic cross-sectional view of disengaged connector assembly 22 shown in FIGS. 2A and 2B. As shown in FIG. 3, first side connector 26 further includes first inductor 46. First inductor 46 defines first axis $A_1$ running in the lengthwise direction. First inductor 46 includes first core 48 and first wire coil 50. First core 48 extends along first axis $A_1$. First wire coil 50 is formed by wire 52 winding around first core 48 to form an inductive winding. First inductor 46 is contained within first protective housing 32 and is adjacent to first end face 36 with first axis $A_1$ approximately perpendicular to first end face 36. First inductor 46 is held in position within first protective housing 32 by potting 54 or other securing means. Wire 52 extends from potting 54 to provide an electrical connection to first inductor 46. Multiple inductive windings on first core 48 may also be used, as discussed later.

FIG. 3 also illustrates that first physical connector element 34 includes two lugs 56 projecting from first protective housing 32 and located at radial positions with respect to first axis $A_1$. Although two lugs 56 are shown, it is understood that the present invention encompasses embodiments including more than two lugs.

As noted above in reference to FIG. 2A, sensor 20 and first side connector 26 are connected at joint 38. As shown in FIG. 3, sensor 20 includes sensor housing 76 having opening 78 through which wire 52 passes into the interior of sensor housing 76. Joint 38 may be, for example, a weld joint or an epoxy joint or potentially one continuous housing structure. First protective housing 32 is sealed over opening 78 at joint 38 such that first side connector 26 projects from sensor housing 76. Together, sensor housing 76 and first protective housing 32 may form a hermetically sealed enclosure.

FIG. 3 also shows that second side connector 28 further includes second inductor 58. Second inductor 58 defines second axis $A_2$ running in the lengthwise direction. Second inductor 58 includes second core 60 and second wire coil 62. Second core 60 extends along second axis $A_2$. Second wire coil 62 is formed by wire 64 winding around second core 60 to form an inductive winding. Second inductor 58 is contained within second protective housing 40 and is adjacent to second end face 44 with second axis $A_2$ approximately perpendicular to second end face 44. Second inductor 58 is held in position within second protective housing 40 by potting 66 or other securing means. Wire 64 extends from potting 66 to provide an electrical connection to second inductor 58. Multiple inductive windings on second core 60 may also be used, as discussed later.

FIG. 3 also illustrates that second physical connector element 42 includes static portion 68, rotating portion 70, and spring element 72. Second protective housing 40 is fixed to an interior of static portion 68. An end of electrical cable 24 is fixed to an exterior of static portion 68 such that second side connector 28 projects from the end of electrical cable 24.

Rotating portion 70 includes slots 74 located at radial positions with respect to second axis $A_2$. Although two slots 74 are shown, it is understood that the present invention encompasses embodiments including more than two slots. Slots 74 are configured to engage lugs 56 while rotating portion 70 rotates about second axis $A_2$ to engage first side connector 26 with second side connector 28 in a bayonet-style engagement.

Figure 4:
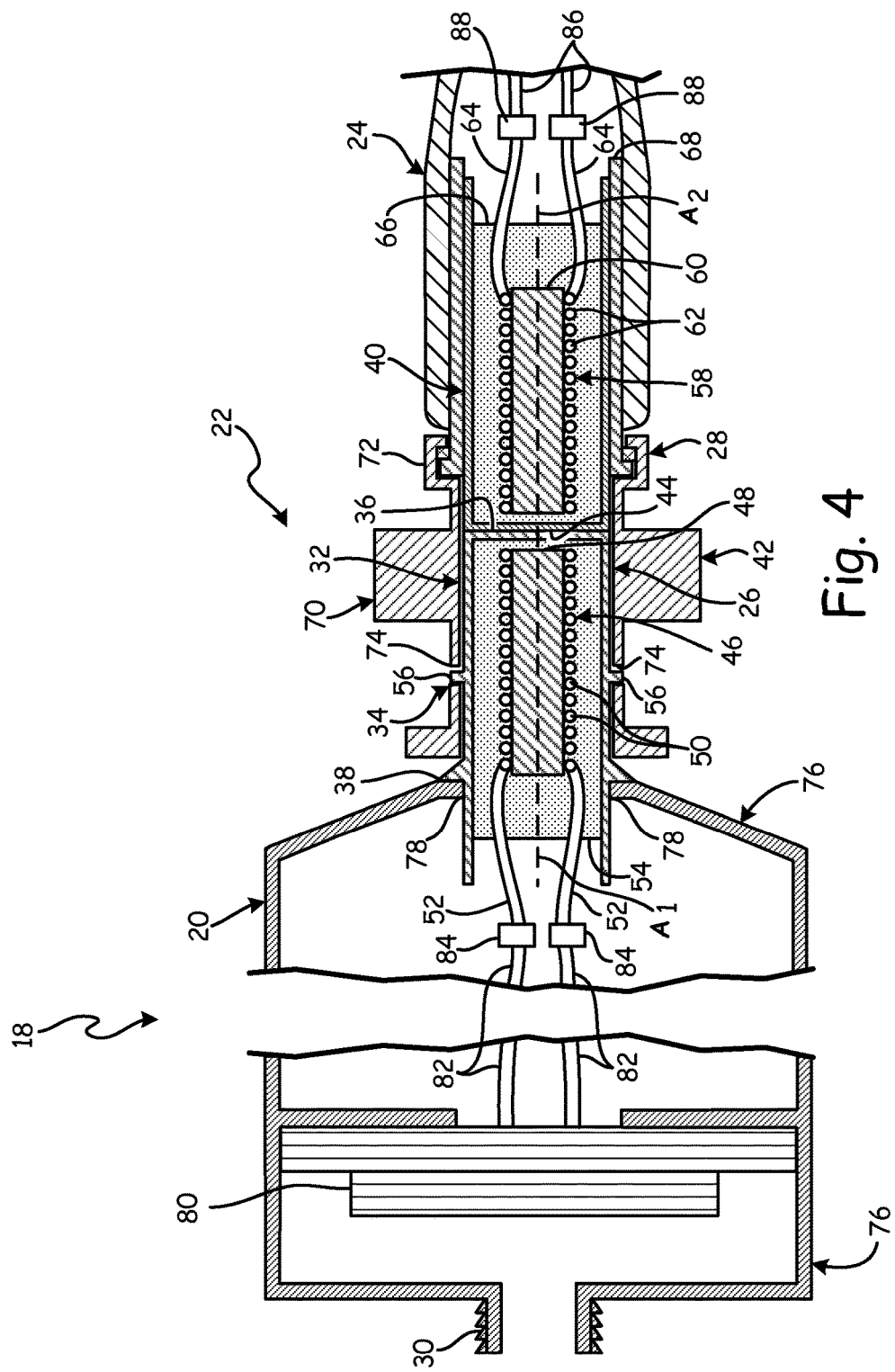
FIG. 4 is a schematic cross-sectional view of a sensor assembly with the connector assembly of FIG. 3 engaged.

FIG. 4 is a schematic cross-sectional view of a transducer assembly 18 with connector assembly 22 of FIG. 3 engaged and forming an inductive telemetry connection. As shown in FIG. 4, sensor 20 further includes sensing element 80, sensor wiring 82 and electrical connection device 84. Sensing element 80 may be, for example, a pressure sensor for sensing pressure within tire 14 (FIG. 1). Sensor wiring 82 electrically connects to sensing element 80 and may be a circuit board. Electrical connection device 84 connects sensor wiring 82 to wire 52 to connect sensor wiring 82 to first wire coil 50 and may be a solder connection to a circuit board. Electrical connection device 84 may be any device for connecting wires, for example, a solder connection.

FIG. 4 also shows that electrical cable 24 includes internal wiring 86 and electrical connection device 88 and may be a circuit board. Internal wiring 86 electrically connects to hub assembly 16 (FIG. 1). Electrical connection device 88 connects internal wiring 86 to wire 64 to electrically connect electrical cable 24 to second wire coil 62. Electrical connection device 88 may be any device for connecting wires, for example, a solder connection.

FIG. 4 illustrates connector assembly 22 after rotating portion 70 has completed its rotation to physically connect first side connector 26 to second side connector 28. The engagement between lugs 56 and slots 74 as rotation portion 70 rotates about second axis $A_2$ positions first end face 36 of first side connector 26 adjacent to second end face 44 of second side connector 28. So engaged, first axis $A_1$ and second axis $A_2$ are generally aligned with each other. First inductor 46 and second inductor 58 are axially spaced apart with at least a portion of first protective housing 32 directly between first inductor 46 and second inductor 58. In the illustrated embodiment, a portion of second protective housing 40, potting 54, and potting 66 are also directly between first inductor 46 and second inductor 58. First end face 36 and second end face 44 are held as close as possible to physical contact and are held in physical contact by the action of spring element 72 acting between static portion 68 which is fixed to second protective housing 40, and rotating portion 70 which holds first protective housing 32 by the engagement of lugs 56 and slots 74.

Due to their proximity and axial alignment, first inductor 46 and second inductor 58 form an inductive telemetry connection between first side connector 26 and second side connector 28. With the inductive telemetry connection between first side connector 26 and second side connector 28, induced current and voltage may pass between hub assembly 16 (FIG. 1) and sensor 20. For example, an alternating current signal from a measurement or control system (not shown) may conduct from hub assembly 16 (FIG. 1), along internal wiring 86 of electrical cable 24 to wires 64 and second wire coil 62. The alternating current flowing through second wire coil 62 creates a magnetic field, which induces a corresponding current to flow through first wire coil 50. The induced alternating current conducts from first wire coil 50 to sensor wiring 82 of sensor 20, thus passing alternating current between hub assembly 16 (FIG. 1) and sensor 20.

First core 48 and second core 60 are preferably made of a material, such as ferrite, to enhance the inductive effect by directing, protecting, and focusing the magnetic fields and flux. Enhancement of the inductive effect improves the transmission efficiency of connector assembly 22.

Embodiments described above include inductors having a single wire coil on either side of connector assembly 22: first inductor 46 including first wire coil 50 in first side connector 26, and second inductor 58 including second wire coil 62 in second side connector 58. However, it is understood that the present invention includes embodiments in which each of first inductor 46 and second inductor 58 include at least one additional wire coil wound around first core 48 and second core 60, respectively, such that there is a plurality of electrically isolated inductive coils (for example, two or more concentric coils) for each of first inductor 46 and second inductor 58. In such embodiments, first inductor 46 and second inductor 58 form a plurality of inductive telemetry connections between first side connector 26 and second side connector 28. The use of multiple coils wound on each core allows multiple power/communication channels to be established by connector assembly 22. Multiple frequencies can also be used to supply power and to communicate data using multiple coils on each core, or using a single coil on each core.

As shown in FIG. 4, when physically connected, first side connector 26 and second side connector 28 do not overlap axially. This allows the use of first protective housing 32 and second protective housing 40 to be free of cavities that would otherwise trap corrosive or abrasive materials. Further, because there is no axial overlap or physical contact between first inductor 46 and second inductor 58, there is no concern for damage from fretting wear. Finally, because there are no pins associated with connector assembly 22, the action of mating and unmating connector assembly 22 is unlikely to cause physical damage to connector assembly 22.

FIG. 5 shows another embodiment in which an array of four inductors 46A-46D are contained in first protective housing 32. Inductors 46A-46D comprise cores 48A-48D with separate wire coils 50A-50D, respectively. Inductors 46A-46D may be isolated from one another by shield 100. Located within second protective housing 42 are inductors 58A-58D, which are aligned axially with inductors 46A-46D, respectively, and may be isolated from one another by shield 102. Inductors 58A-58D comprise cores 60A-60D and separate wire coils 62A-62D, respectively.

The use of an array of aligned inductors allows multiple communication channels to be established through the connector assembly.

Embodiments of the present invention provide more reliable, durable and easy to use connections to address the problems recited above for applications involving electrical signals by replacing the pins and sockets that physically connect to create an electrical connection path in a pinned connector assembly with a pair of inductors. The inductors are on opposite sides of the connector assembly, and provide a path for passing an induced current or voltage through the connector assembly. The inductors inductively couple between the opposite sides of the connector assembly to form an inductive telemetry connection when a physical connector connects the opposite sides of the connector assembly. The inductors align along a common axis but do not overlap axially. By arranging the inductors in this fashion, a simple, easy to connect assembly may be formed. This is in contrast to connector assemblies having inductors that overlap axially. Such an overlapping arrangement requires complex structures that are expensive to manufacture and include cavities with the potential to trap corrosive or abrasive debris. In some embodiments, one of the sides of the connector assembly includes a protective housing that is necessarily in a gap between the two inductive transformers. This protective housing provides excellent environmental protection and, in some embodiments, may be part of a hermetic assembly.

Discussion of Possible Embodiments

The following are non-exclusive descriptions of possible embodiments of the present invention.

An assembly for forming an inductive telemetry connection incudes a first side connector and a second side connector. The first side connector includes a first protective housing including a first end face; a first inductor contained within the first protective housing and adjacent to the first end face, the first inductor having a first axis; a first physical connector element. The second side connector includes a second protective housing including a second end face; a second inductor contained within the second protective housing and adjacent to the second end face, the second inductor having a second axis; and the second physical connector element configured to engage with the first physical connector element such that the first end face the second end face are adjacent, and physically connect the first side connector to the second side connector such that the first axis and the second axis are generally aligned with each other, the first inductor and the second inductor are axially spaced apart, and a portion of the first protective housing is directly between the first inductor and the second inductor. The first inductor and the second inductor form an inductive telemetry connection between the first side connector and the second side connector.

The assembly of the preceding paragraph can optionally include, additionally and/or alternatively, any one or more of the following features, configurations and/or additional components:

The first inductor includes: a first core extending along the first axis, the first core including a magnetic material; and at least one wire coil wound around the first core forming an inductive winding The second inductor includes: a second core extending along the second axis, the second core may including a magnetic material; and at least one wire coil wound around the second core forming an inductive winding.

The first protective housing is made of a polymer, such as molded plastic.

The first protective housing is made of metal.

The first protective housing metal is a stainless steel.

The first physical connecting element includes a plurality of lugs extending radially from the first protective housing.

The second physical connecting element includes a plurality of slots configured to engage the plurality of lugs and physically connect the first side connector end to the second side connector end in a bayonet-style engagement.

A connector assembly includes a first side connector and a second side connector. The first side connector including: a first protective housing including a first end face; a first inductor contained within the first protective housing and adjacent to the first end face, the first inductor having a first axis; a first physical connector element. The second side connector includes the second protective housing including a second end face; a second inductor contained within the second protective housing and adjacent to the second end face, the second inductor having a second axis; and a second physical connector element engaged with the first physical connector element, and physically connecting the first side connector to the second side connector such that the first end face and the second end face are adjacent, the first axis and the second axis are aligned with each other, the first inductor and the second inductor are axially spaced apart, and a portion of the first protective housing is directly between the first inductor and the second inductor. The first inductor and the second inductor form an inductive telemetry connection between the first side connector and the second side connector.

The assembly of the preceding paragraph can optionally include, additionally and/or alternatively, any one or more of the following features, configurations and/or additional components:

The first inductor includes: a first core extending along the first axis, the first core including a magnetic material; and at least one wire coil wound around the first core forming an inductive winding.

The second inductor includes: a second core extending along the second axis, the second core including a magnetic material; and at least one wire coil wound around the second core forming an inductive winding.

The first protective housing is made of metal.

The metal is a stainless steel.

The second protective housing is made of a polymer material.

The first physical connecting element includes a plurality of lugs extending radially from the first protective housing.

The second physical connecting element includes a plurality of slots shaped to engage the plurality of lugs and physically connect the first side connector to the second side connector in a bayonet-style engagement.

The first inductor further includes at least one additional wire coil wound around the first core.

The second inductor further includes at least one additional wire coil wound around the second core, such that there is a plurality of electrically isolated inductive coils for each of the first side connector and the second side connector.

The first inductor and the second inductor form a plurality of inductive telemetry connections between the first side connector and the second side connector.

A sensor assembly includes a sensor, an electrical cable and the connector assembly described above.

The sensor includes a sensing element; sensor wiring connected to the sensing element; and a sensor housing containing the sensing element, the sensor housing including an opening through which an electrical connection to the sensor wiring passes.

The electrical cable is for electrically connecting to a measurement or control system.

The first wire coil is electrically connected to the sensor wiring, the first protective housing is sealed over the opening in the sensor housing such that the first side connector projects from the sensor housing, and the sensor housing and the first protective housing together form a hermetically sealed enclosure, and the second wire coil is electrically connected to an end of the electrical cable, and the second side connector projects from the end of the electrical cable.

The sensing element is a pressure sensor and the transducer is a tire pressure sensor.

A landing gear assembly comprises a wheel; a tire fitted around the wheel; and the transducer assembly described above, wherein the transducer assembly is fitted to the wheel such that the sensor senses pressure within the tire, and the connector assembly is positioned external to the wheel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for forming an inductive telemetry connection comprising:
    a first side connector including:
        a first protective housing including a first end face;
        a first inductor contained within the first protective housing and adjacent to the first end face, the first inductor having a first axis; and
        a first physical connector element; and
    a second side connector including:
        a second protective housing including a second end face;
        a second inductor contained within the second protective housing and adjacent to the second end face, the second inductor having a second axis; and
        a second physical connector element including a static portion partly enclosing the second protective housing and a rotating portion configured to engage and mate with the first physical connector element via a bayonet-style engagement such that the first end face the second end face are adjacent, and physically connect the first side connector to the second side connector such that the first axis and the second axis are generally aligned with each other;
    wherein the first inductor and the second inductor form an inductive telemetry connection between the first side connector and the second side connector; and
    wherein the first physical connecting element includes a plurality of lugs extending radially from the first protective housing, and the rotating portion of the second physical connecting element includes a plurality of slots configured to engage the plurality of lugs and physically connect the first side connector to the second side connector in the bayonet-style engagement.

2. The assembly of claim 1, wherein the first inductor includes:
   a first core extending along the first axis, the first core including a material to promote inductive coupling between the first inductor and the second inductor material; and
   at least one wire coil wound around the first core forming an inductive winding; and the second inductor includes:
   a second core extending along the second axis, the second core including a material to promote inductive coupling between the first inductor and the second inductor material; and
   at least one wire coil wound around the second core forming an inductive winding.

3. The assembly of claim 2, wherein the first protective housing is made of metal or a polymer.

4. The assembly of claim 3, wherein the first protective housing is a stainless steel.

5. A connector assembly:
   a first side connector including:
      a first protective housing including a first end face;
      a first inductor contained within the first protective housing and adjacent to the first end face, the first inductor having a first axis; and
      a first physical connector element which includes a plurality of lugs extending radially from the first protective housing; and
   a second side connector including:
      a second protective housing including a second end face;
      a second inductor contained within the second protective housing and adjacent to the second end face, the second inductor having a second axis; and
      a second physical connector element engaged with the first physical connector element via a bayonet-style engagement, and physically connecting the first side connector to the second side connector such that the first end face and the second end face are adjacent, the first axis and the second axis are generally aligned with each other, and the first inductor and the second inductor are axially spaced apart, wherein the second physical connector includes a static portion that partly encloses the second protective housing and a rotating portion that includes a plurality of slots configured to engage the plurality of lugs and physically connect the first side connector to the second side connector in the bayonet-style engagement;
   wherein the first inductor and the second inductor form an inductive telemetry connection between the first side connector and the second side connector.

6. The connector assembly of claim 5, wherein:
   the first inductor includes:
      a first core extending along the first axis, the first core including a material to promote inductive coupling between the first inductor and the second inductor material; and
      at least one wire coil wound around the first core forming an inductive winding; and
   the second inductor includes:
      a second core extending along the second axis, the second core including a material to promote inductive coupling between the first inductor and the second inductor material, and
      at least one wire coil wound around the second core forming an inductive winding.

7. The connector assembly of claim 6, wherein the first protective housing is made of metal or polymer.

8. The connector assembly of claim 7, wherein the metal is a stainless steel.

9. The connector assembly of claim 7, wherein the second protective housing is made of a polymer material.

10. The connector assembly of claim 5, wherein
    the first inductor further includes at least one additional wire coil wound around the first core; and
    the second inductor further includes at least one additional wire coil wound around the second core, such that there is a plurality of electrically isolated inductive coils for each of the first aide connector and second side connector;
    wherein the first inductor and the second inductor form a polarity of inductive telemetry connections between the first side connector and the second side counter.

11. A transducer assembly including:
    a sensing element;
    sensor wiring or interconnect connected to the sensing element; and
    a sensor housing containing the sensing element, the sensor housing including an opening through which an electrical connection to the sensor wiring passes;
    an electrical cable for electrically connecting to a measurement or control system; and
    the connector assembly according to claim 6, wherein the at least one wire coil wound around the first core is electrically connected to the sensor wiring, the first protective housing is sealed over the opening in the sensor housing such that the first side connector projects from the sensor housing, and the sensor housing and the first protective housing together form a hermetically sealed enclosure; and wherein the at least one wire coil wound around the second core is electrically connected to an end of the electrical cable, and the second side connector is located at the end of the electrical cable.

12. The transducer of assembly claim 11, wherein the sensing element is a pressure sensor and the pressure sensor is a tire pressure sensor.

13. A landing gear assembly comprising:
    a wheel;
    a tire fitted around the wheel; and
    the transducer assembly as claimed in claim 12, wherein the transducer assembly is fitted to the wheel such that the sensor senses pressure with the tire, and the connector assembly is positioned external to the wheel.

* * * * *